Jan. 18, 1966  Z. RAEM  3,229,714
REGULATING VALVE WITHIN A COUPLING
Filed June 7, 1963
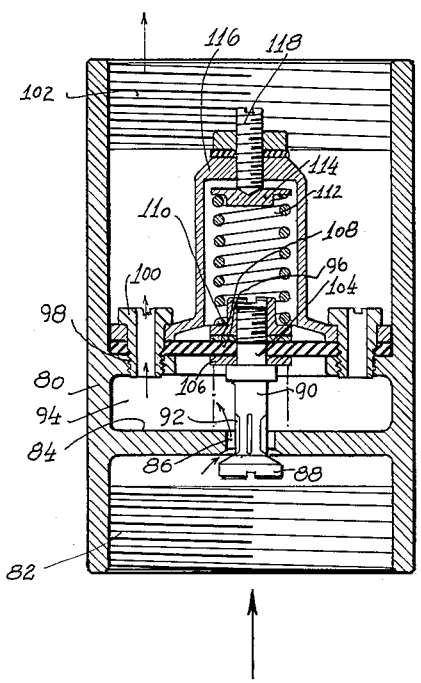
INVENTOR.
ZEEV RAEM
BY United States Patent Office 3,229,714
Patented Jan. 18, 1966

3,229,714
REGULATING VALVE WITHIN A COUPLING
Zeev Raem, 22 Shlomo Hamelech, Tel Aviv, Israel
Filed June 7, 1963, Ser. No. 286,288
2 Claims. (Cl. 137—505.41)

This invention relates to regulating valves and systems for water and other fluids, which valves respond to a pressure higher than the predetermined pressure for which the valve is set to either close the flow completely or to permit a slow flow of water. These valves find a variety of uses such as, for example, in the supply lines of sprinkler systems, or in drinking fountains.

Among the objects of the present invention are to provide a novel regulating valve which is positive and efficient in operation, simple and compact in construction, and inexpensive to manufacture.

A preferred embodiment of the invention is illustrated by way of example in the single figure of the attached drawing, which is a longitudinal sectional view of a regulating valve constructed in accordance with the invention.

The valve illustrated in the drawing comprises a substantially cylindrical housing 80 whose bottom inlet end 82 is adapted for connection with the water supply line. Near the inlet end, the housing is formed with a transverse partition 84 dividing it into two chambers which are in communication by means of a central aperture or opening 86. The bottom periphery of aperture 86 constitutes the valve seat for the valve member or disc 88 which is carried by the valve stem 90. The latter is disposed in the upper chamber 94 and extends through aperture 86 so that the valve disc 88 is disposed at the inlet side of the aperture. A number of axially extending grooves 92 are formed around the stem 90, which grooves permit the water to flow from the inlet 82 to chamber 94 above partition 84 when the valve disc 88 is off its seat. Chamber 94 is delimited at the top by a membrane 96 mounted on an annular shoulder 98 integral with the wall of housing 80. A tubular bushing 100 screwed into shoulder 98 permits the flow of water from chamber 94 to the outlet end 102 of the housing 80, this end being adapted for connection to the feed line of a sprinkler or the like.

The valve stem 90 has an upper section 104 of reduced diameter whose top end is threaded and is mounted to membrane 96. The mounting is effected by two annular washers 106 and 108 between which the membrane 96 is held, the upper washer 108 being screwed into the section 104. To the top of section 104 an inverted tubular bushing 110 is screwed which provides a seat for the lower end of a compression coil spring 112, the upper end of spring 112 abutting against a substantially solid bushing 114. This bushing is held in a surrounding sleeve, which is in the form of a bellshaped cover 116, a pin 118 threaded into the top of cover 116 and abutting the top of bushing 114. By screwing pin 118 more or less into cover 116, the force of spring 112 can be adjusted to a predetermined magnitude. As shown, sleeve 116 is substantially coaxial with respect to valve stem 90. The lower end of sleeve 116, of enlarged diameter, is engageable with the outer periphery of membrane 96 and is mounted thereto and to shoulder 98 of the housing by means of bushing 100.

The valve works as follows:

Under normal flow conditions according to which the force of spring 112 has been adjusted to keep the membrane 96 bulging downwardly and the valve disc 88 below its seat, the water flows from end 82 between grooves 92 and aperture 86 into chamber 94, as shown by the arrows. From there the water escapes through bushing 100 to the outlet end 102 of housing 80. If now water under increased pressure flows through inlet end 82 and grooves 92, it acts on membrane 96, subjecting it to pressure which overcomes the force of spring 112 so that the membrane is forced upwardly taking with it the stem 90, whereupon the disc 88 is applied against its seat. Since after the valve has been closed there is no longer any positive pressure acting on membrane 96 from below, the force of spring 112 again presses the membrane downwardly to open the valve. This opening and closing operation continues until the pressure of the inflowing water is again lowered to the predetermined level, the outflow of the water from the valve being described because of this opening and closing operation. Thus any fixtures mounted in the outflow line such as a sprinkler will not be damaged by the increased supply pressure.

In this embodiment, it is seen that chambers or compartments 94 and 100 together constitute the outlet chamber, since both receive the water after it has passed through the regulating valve. Membrane 96, disposed in compartment 94, provides an enlarged surface area for sensing the excessive pressure in that compartment. Also, with the valve disc 88 disposed at the inlet side of aperture 86, it will be seen that the inlet pressure will always tend to keep the valve closed, should the valve stem become detached from the membrane, or the membrane otherwise become ineffective to close the valve.

While the invention has been described with respect to a preferred embodiment thereof, it will be understood that various modifications can be made in the described embodiment and that the several described features can be used in other embodiments and applications alone or in combination, without departing from the spirit or scope of the invention as defined in the following claims.

I claim:

1. A pressure regulating valve comprising: a housing; a partition dividing said housing into at least two chambers, one of the chambers communicating with the inlet side of the valve and the other chamber communicating with the outlet side; said partition being formed with an opening permitting the flow of the fluid between the two chambers; a valve stem disposed in said one chamber and passing through said opening into said other chamber; a valve member carried by said valve stem and disposed at the inlet side of said opening; said housing being further formed with an annular flange on the inner surface thereof in said other chamber; a diaphragm secured to said annular flange and supporting said valve stem so that said valve member is movable in said one chamber from an open position away from said opening to a closed position seated against said opening, said diaphragm having an enlarged surface area in the outlet chamber for sensing an excessive pressure and effective to move said valve member toward the closed position upon sensing an excessive pressure in said outlet chamber; a cover disposed within said housing to overlie said diaphragm and also secured to said annular flange; and a spring interposed between said cover and said diaphragm and biasing said valve member to its open position; the diaphragm and the cover being sceured to said annular flange by means of at least one bushing having an opening therethrough providing the communication for the fluid between said other chamber and the outlet side of said valve.

2. A valve as defined in claim 1, wherein said bushing is threadedly received on said annular flange.

(References on following page)

References Cited by the Examiner

UNITED STATES PATENTS

| | | | |
|---|---|---|---|
| 374,445 | 12/1887 | Blair | 137—505.39 X |
| 383,314 | 5/1888 | McLaughlin | 137—505.25 |
| 444,082 | 1/1891 | Abbe | 137—505.25 |
| 1,956,787 | 5/1934 | Birch | 137—505.41 |
| 2,702,048 | 2/1955 | Coffey | 137—505.13 |
| 2,861,588 | 11/1958 | Cronk | 137—505.12 |
| 2,868,223 | 1/1959 | Lum | 137—505.44 X |
| 2,888,033 | 5/1959 | Eickmeyer | 137—505 |
| 2,888,949 | 6/1959 | Evans | 137—505.25 |
| 3,089,510 | 5/1963 | Lum | 137—515.44 X |
| 3,094,141 | 6/1963 | Maienknecht | 137—505.25 |

FOREIGN PATENTS

| | | |
|---|---|---|
| 1,108,998 | 1/1961 | Germany. |
| 489,891 | 1/1954 | Italy. |

ISADOR WEIL, *Primary Examiner.*